US007656863B2

(12) United States Patent
Wang et al.

(10) Patent No.: US 7,656,863 B2
(45) Date of Patent: Feb. 2, 2010

(54) METHOD FOR SOFT SWITCH CALL CONTROL AND SOFT SWITCH DEVICE USING THE SAME

(75) Inventors: Sihai Wang, Shanghai (CN); Zhikun Wan, Shanghai (CN); Weihong Chen, Shanghai (CN); Hong Shen, Shanghai (CN); Jie Weng, Shanghai (CN)

(73) Assignee: Alcatel, Paris (FR)

( * ) Notice: Subject to any disclaimer, the term of this patent is extended or adjusted under 35 U.S.C. 154(b) by 898 days.

(21) Appl. No.: 11/225,038

(22) Filed: Sep. 14, 2005

(65) Prior Publication Data

US 2006/0133353 A1   Jun. 22, 2006

(30) Foreign Application Priority Data

Dec. 21, 2004   (CN) ........................ 2004 1 0093308

(51) Int. Cl.
*H04L 12/66* (2006.01)
*H04M 7/00* (2006.01)
(52) U.S. Cl. ........................ 370/352; 370/356; 370/401; 379/221.08; 379/230
(58) Field of Classification Search ................. 370/352, 370/356, 395.5, 401; 379/221.08, 230
See application file for complete search history.

(56) References Cited

U.S. PATENT DOCUMENTS

| 6,873,858 | B1 * | 3/2005 | Aguilar et al. ........... 455/552.1 |
| 6,910,074 | B1 * | 6/2005 | Amin et al. ................ 709/227 |
| 2007/0153766 | A1 * | 7/2007 | Bienn et al. ................. 370/352 |

OTHER PUBLICATIONS

Noh Jeong Min: "Re: [Megaco] Hairpin Connection Doubts" IETF Mail Archive, Nov. 28, 2002, pp. 1-2, XP002439385.
Cuervo F, et al.: "Megaco Protocol" IETF Internet Draft, Apr. 16, 1999, XP015022845.

* cited by examiner

*Primary Examiner*—Harry S Hong
(74) *Attorney, Agent, or Firm*—Harness, Dickey & Pierce P.L.C.

(57) ABSTRACT

A method for soft switch call control and a soft switch device therefore are provided. The soft switch device acquires an initial address message (IAM) at a calling side, analyzes information of the calling party and the called party based on the acquired initial address message (IAM), and informs the media gateways to create a context and to add TDM semi-permanent physical terminations of time slots corresponding to the calling party and the called party into the context when the calling party and the called party are controlled by the same media gateway. Thus, it can implement a local loop of TDM voice, reduce IP loop of RTP streams and efficiently reduces network resources such as steps for digital signal processing, echo elimination and etc.

8 Claims, 6 Drawing Sheets

METHOD FOR SOFT SWITCH CALL CONTROL AND SOFT SWITCH DEVICE USING THE SAME

TECHNICAL FIELD

The present invention relates to communication technique, particularly to method for soft switch call control and corresponding soft switch device in Next Generation Network (NGN).

BACKGROUND

The object of soft switch technique, as a core technique of Next Generation Network (NGN), is to build a next generation public network on a basis of packets to implement transition from Public Switch Telephone Network (PSTN) to Next Generation Network (NGN). NGN is a next-generation-oriented network and can provide an integrated opening network including a variety of services such as voice, data and multimedia. Hierarchy technique is utilized in NGN network, i.e. a whole network is partitioned into four layers, and the core techniques of the NGN network consist in service control and call control isolation.

Figure 1:
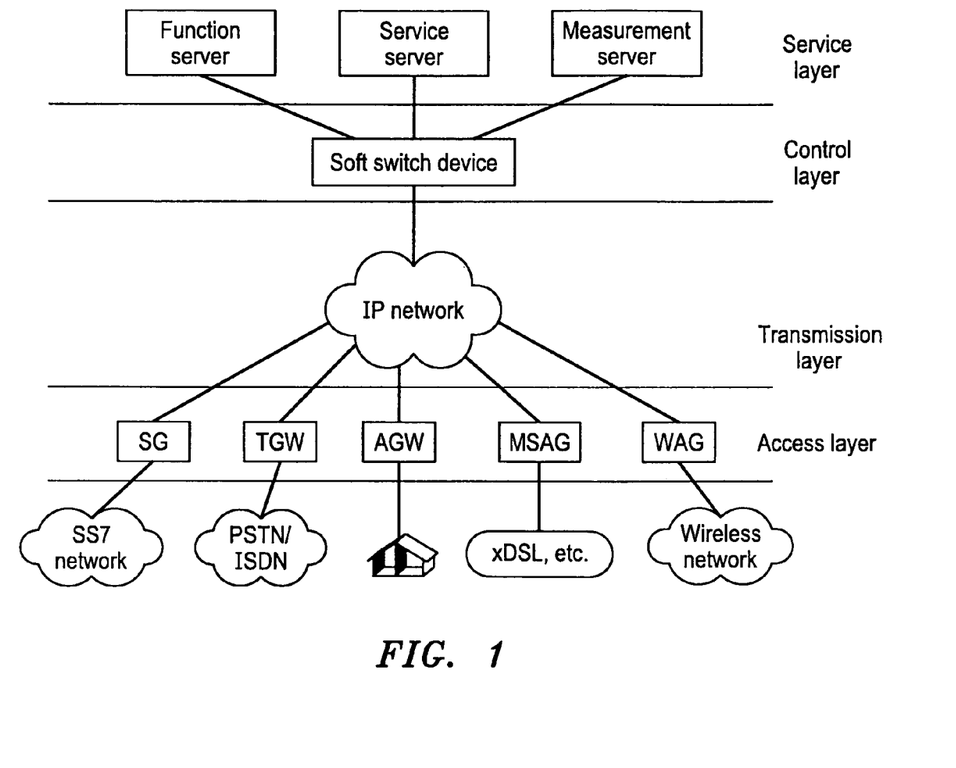
FIG. 1 is an architecture of a soft switch system.

As illustrated in FIG. 1, a soft switch system has 4 logical function layers. Different from traditional PSTN network, the four function layers, i.e. access layer, transmission layer, control layer and service layer, are completely isolated. Also, each function layer is configured using network devices having opening interfaces to form an integrated opening NGN framework.

1. Access layer: it provides a plenty of access means which connect users to a packet network and convert information format into the one that can be transmitted over a packet network;

2. Transmission layer: it provides a high-reliable, end-to-end, QoS-guaranteed, integrated transmission platform using packet technique, and provides bandwidth transmission channels for all kinds of medias.

3. Control layer: it mainly provides functions for call control and processing as well as protocols, service providing and intercommunication.

4. Service layer: it provides a plurality of network services using opening service interfaces.

In the above soft switch system, the soft switch device is control unit in a NGN network, which provides functions of call control and connection control for each device in a network, and was once called as call server, call agent or Media Gateway Controller (MGC) in different applications. Media Gateway (MG) performs overload transmission of voice streams in a network and controls conversion between one type of media stream such as Time-Division-Multiplexing (TDM)-based voice and another type of media stream such as IP/ATM data stream of IP-based Realtime Transmission Protocol (RTP). Media Gateway can be classified as Access Gateway (AGW), Trunk Gateway (TGW), Integrated Access Device (IAD) and etc. Signaling Gateway (SG) performs signaling conversion and intercommunication between a circuit switching network and a packet network and it can be a part of the access gateway. Generally, H.248 media gateway control protocol is used between a soft switch device and a media gateway, by which soft switch controls connection, establishing and release of media streams over the media gateway. The connection models defined in H.248 protocol include two main concepts, i.e. Termination and Context. Termination is a logic entity in the media gateway and can transmit and receive one or more types media streams. The main types of Termination are semi-permanent physical termination such as TDM channel or analog line, etc. and ephemeral termination such as RTP stream for carrying voice, data and video signals and all kinds of composite signals. Context indicates relations between some terminations and is a parameter describing topological relation between terminations and media hybrid/switching. It can be created by ADD command, be deleted by Subtract command and control transition of terminations between contexts by MOVE command.

Figure 2:
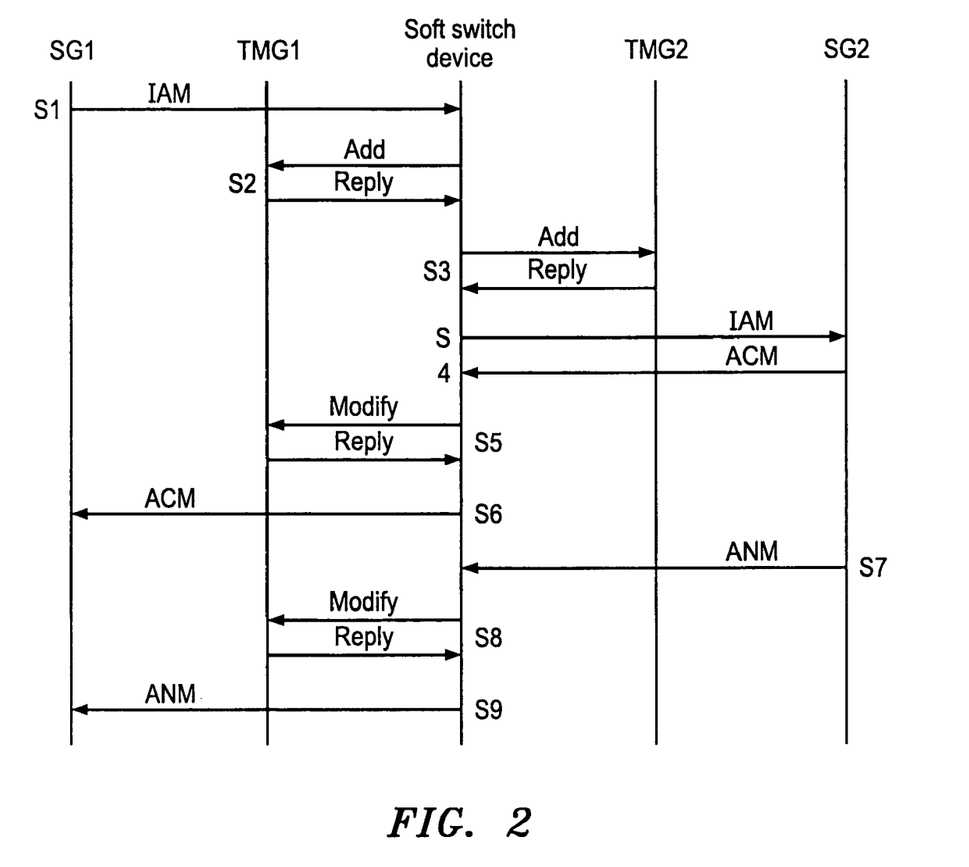
FIG. 2 is a call control method for controlling a trunk gateway using a standard H.248 protocol.

FIG. 2 illustrates steps for a corresponding standard H.248 protocol controlling a trunk gateway to establish call control.

S1: The calling party dials and transmits Initial Address Message (IAM) to a soft switch device via signaling gateway SG1;

S2: The soft switch device creates a new context in TGW1 and adds TDM termination and RTP termination in the context;

S3: The soft switch device creates a new context in TGW2 and adds TDM termination and RTP termination in the context;

S4: The soft switch device transmits IAM to a circuit switching network via signaling gateway SG2, the circuit switching network reply with Address Completion Message (ACM), the called party rings;

S5: The soft switch device transmits Modify command to TGW1, notifies of a remote RTP port number and IP address, and notifies of transmitting a ring back tone;

S6: The soft switch device transmits ACM to SG1;

S7: The called party off-hooks, SG2 transmits Answer Message (ANM) to the soft switch device;

S8: The soft switch device transmits Modify command to TMG1 and cuts off the ring back tone;

S9: The soft switch device transmits ANM to SG1.

Figure 3:
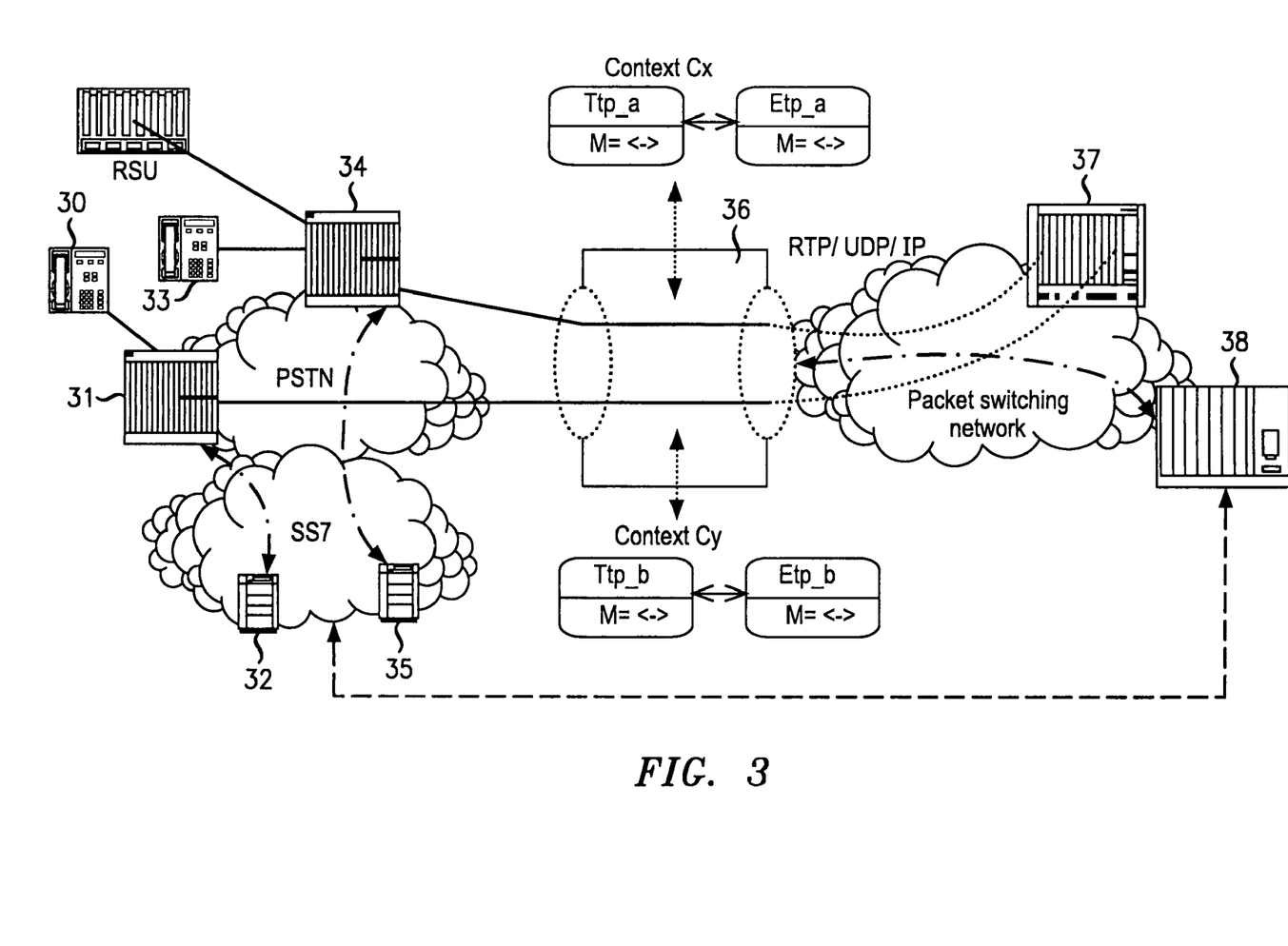
FIG. 3 is a schematic diagram illustrating an end-to-end connection of media streams under the same trunk gateway using the call control method of the standard H.248 protocol.

However, generally for users under control of the same media gateway, either two users under AGW (not shown) or users of two Local Exchangers (LEX) connected by the same TGW, it is needed to create two contexts to perform conversion of media streams. As shown in FIG. 3, which is a schematic diagram for end-to-end connection of carrying channels under the same trunk gateway using the standard H.248 protocol call control establishing method, when a service call such as a voice call is made between two telephone users 30, 33 on two exchangers 31, 34 connected to the same trunk gateway 36, the processing proceeds according to the above standard H.248 call control method. Calling party 30 dials and the signaling message thereof transmits Initial Address Message (IAM) to soft switch device 38 via signaling gateway 32. Soft switch device 38 needs to control trunk gateway 36 to create a new context Context Cx for calling party 30 and to add TDM termination Ttp_a and RTP termination Etp_a in the context. As such, it needs to create another new context Context Cy in the same trunk gateway 36 and to add TDM termination Ttp_b and RTP termination Etp_b in the context. TDM voice streams on calling side need to be converted into RTP streams by the media gateway, to pass through routing device 37 in a packet switching network, and to be re-converted into TDM streams, which implements normal communication between the calling party and the called party.

In the above event, for service establishment between the calling party and the called party under the same media gateway, the media gateway needs to perform conversion of media streams together with associated processing, such as digital signal processing, echo cancelling and etc., which will waste resources of the media gateway. The packet switching network needs to achieve IP loop of RTP streams, which will waste network resources.

CONTENTS OF INVENTION

The present invention is directed to provide a method for soft switch call control, which makes improvements for function and flow of control on a basis of H.248 protocol controlled media gateway so as to support a local loop with call control of two TDM terminations under the same gateway, said method for soft switch call control comprising the steps of:

A) a calling party originating a call and a soft switch device acquiring an initial address message (IAM) at the calling side;

B) the soft switch device analyzing information of the calling party and a called party, creating a context at said media gateway and adding semi-permanent physical terminations for the calling party and the called party into the context when the calling party and the called party are controlled by the same media gateway;

C) the soft switch device transmitting the initial address message (IAM) to a circuit switching network via a signaling gateway at the called side, the circuit switching network returning an acknowledge message (ACM) and the called party ringing;

D) the soft switch device transmitting an address complete message (ACM) and the media gateway transmitting a ring back tone.

Preferably, said step B) comprises the steps of:

B1) the soft switch device controlling the media gateway at the calling side to create a new context and to add a semi-permanent physical termination and a ephemeral termination into the context;

B2) the soft switch device analyzing information of the calling party and the called party, informing the media gateway of deleting the ephemeral termination from the context created at the calling side when the calling party and the called party are controlled by the same media gateway;

B3) the soft switch device informing the media gateway of adding the semi-permanent physical termination at the called side into the context created at the calling side.

When the called party off-hooks, the method further comprises:

E) the called party off-hooking and a signaling gateway at the called side transmitting an answer message to the soft switch device;

F) the soft switch device transmitting a Modify command to the media gateway and cutting off the ring back tone;

G) the soft switch device transmitting an answer message to the signaling gateway at calling side.

The present invention also provides a soft switch device connected to a number of media gateways via a packet switching network and controlling the media gateways to establish service calls based on a received call signaling, characterized in that the soft switch device analyzes information of a calling party and a called party based on an acquired initial address message (IAM), and informs the media gateways to create a context at said media gateway and to add semi-permanent physical terminations for the calling party and the called party into the context when the calling party and the called party are controlled by the same media gateway.

Preferably, the soft switch device comprises:

call processing unit for performing call control and processing, analyzing information and service logic of the calling party and the called party and informing a connection control unit of connection control information, which is used for creating a context in the media gateway and adding semi-permanent physical terminations for the calling party and the called party into the context when the calling party and the called party are controlled by the same media gateway;

resource management unit for managing resource state information of the calling party and the called party;

connection control unit for controlling connecting, establishing and releasing of media streams in the media gateway based on the connection control information from the call processing unit and receiving a response message from the media gateway.

According to the method and the soft switch device of the present invention, the soft switch device determines home of the calling party and the called party based on the numbers thereof, instructing the media gateway to create a context containing semi-permanent physical terminations (such as trunk time slots) corresponding to the calling party and the called party, so that a local loop of media streams (TDM voice) of the calling party and the called party can be implemented and system resource of the soft switch device such as steps for digital signal processing, echo cancelling can be reduced. Meanwhile, the present invention reduce IP loop of RTP streams and further efficiently reduces network resources of the packet switching network.

MODE OF CARRYING OUT THE INVENTION

The following provides detailed description of the preferred mode of carrying out the present invention in conjunction with the figures.

Figure 4:
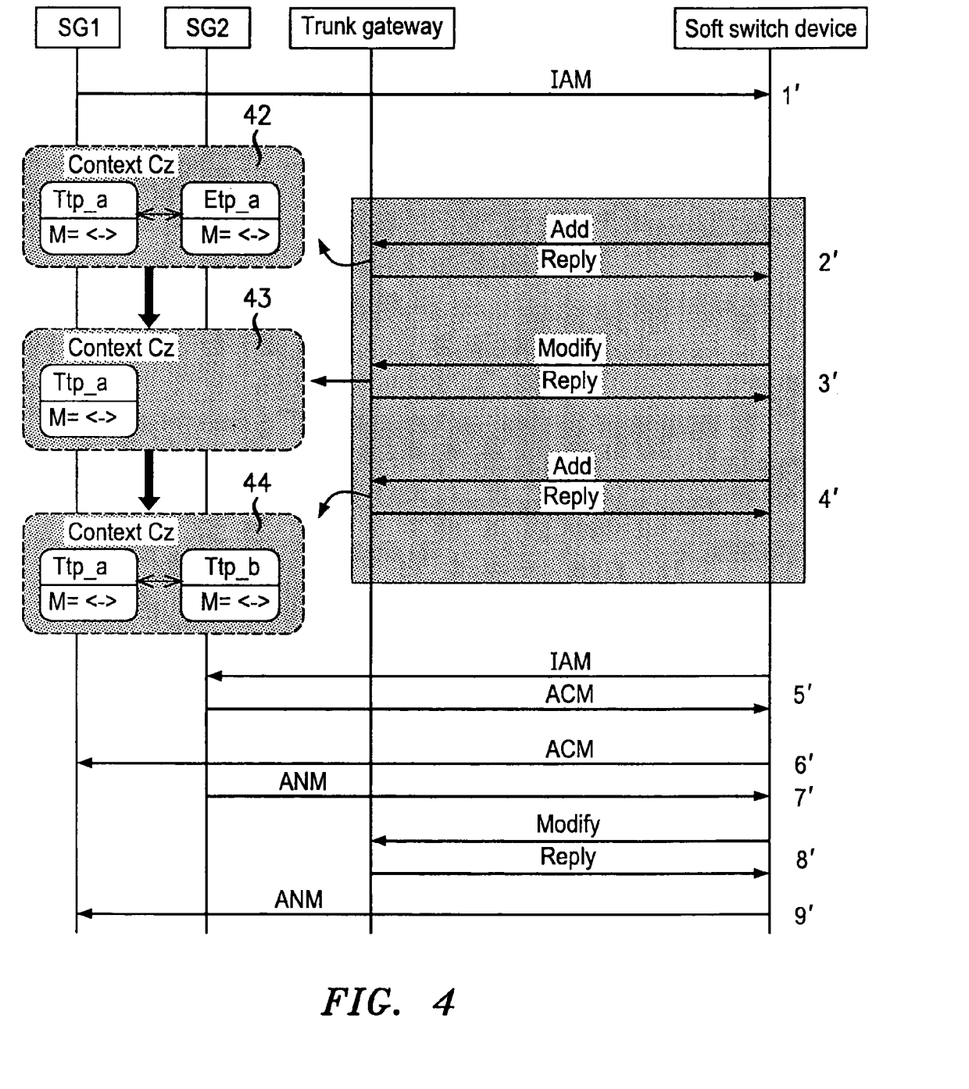
FIG. 4 is one of the embodiments of soft switch call control method of the present invention.

FIG. 4 is one of the embodiments of soft switch call control method of the present invention. MGC controls establishing user's call under the same trunk gateway. At first, a calling party originates a call and a soft switch device acquires an initial address message IAM at a calling side by signaling gateway SG1 (Step 1'). The soft switch device controls a trunk gateway at the calling side to create a new context Cz and to add a TDM termination Ttp_a and a RTP termination Etp_a at the calling side based on information of the calling party provided in the IAM, and the trunk gateway at the calling side feed a message for creating back to the soft switch device (Step 2'). The context created by the trunk gateway at the calling side is shown at 42 in the figure. Then, the soft switch device analyzes information of the calling party and a called party and controls the trunk gateway to delete RTP termination Etp_a from the context when the calling party and the called party are controlled by the same trunk gateway. As such, the media gateway needs to feed information of performance back to the soft switch device (Step 3'). The context created by the trunk gateway is shown at 43 in the figure. The soft switch device further informs the trunk gateway of adding a TDM termination Ttp_b at the called side into the context, and the media gateway creates the associated termination based on condition of resources and responds to the soft switch device (Step 4'). The context created by the trunk gateway is shown at 44 in the figure. At last, the soft switch device transmits the IAM to a circuit switching network via signaling gateway SG2, the circuit switching network returning an ACM and the called party ringing (Step 5'). The soft switch device transmits an ACM to the signaling gateway SG1 at the calling side (Step 6'). The called party off-hooks and signaling gateway SG2 transmits an ANM to the soft switch device (Step 7'). The soft switch device transmits a Modify command to the trunk gateway and cuts off a ring back tone (Step 8'). The soft switch device transmits an ANM to signaling gateway SG1 (Step 9'). With respect to steps for call establishment not controlled by the same trunk gateway, the method illustrated in FIG. 1 can be referred to and herein detailed description is not provided.

It shall be noted that the establishment of the context Cz in the media gateway does not need to follow the above steps and this embodiment is in consideration of consistence with control flow of H.248 standard protocol. As an alternative embodiment, the soft switch device can analyze the information of the calling party and the called party after acquiring the initial address message IAM at the calling side, directly control the trunk gateway to create a context and to add TDM terminations Ttp_a, Ttp_b when the calling party and the called party are controlled by the same trunk gateway, and perform other steps for call control.

Figure 5:
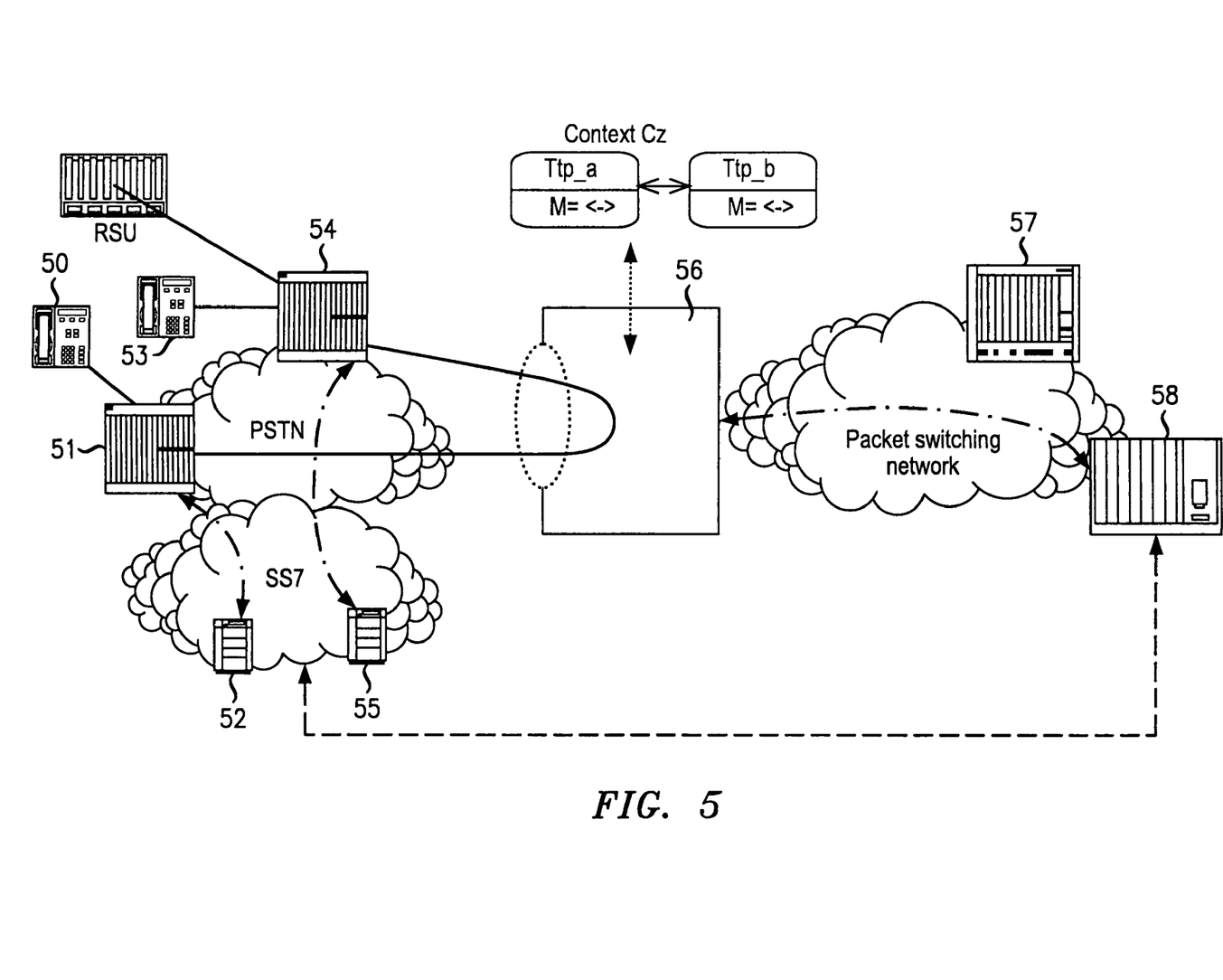
FIG. 5 is an end-to-end connection of carrier channels under the same trunk gateway using the soft switch call control method of the present invention.

FIG. 5 is an end-to-end connection of carrier channels under the same trunk gateway using the soft switch call control method of the present invention. When a voice call is performed between two telephone users 50, 53 respectively connected to two switches 51, 54 under the same trunk gateway 56, calling party 50 dials and a signaling message thereof transmits an initial address message IAM to soft switch device 58 via signaling gateway 52. Soft switch device 58 needs to control trunk gateway 56 to create a new context Cz and to add TDM termination Ttp_a and RTP termination Etp_a into the context for calling party 50. Then, the soft switch device analyzes information of the calling party and the called party and controls the trunk gateway to delete RTP termination Etp_a from the context and to further add TDM termination Ttp_b at the called side when the calling party and the called party are controlled by the same trunk gateway and the types of media streams needed to be established are the same. The trunk gateway is informed by the above steps of ultimately creating context Cz with TDM terminations of the calling party and the called party. Thus, a local loop of TDM voice is implemented in the trunk gateway, which reduces IP loop of RTP streams and efficiently reduces resources of the trunk gateway and the packet switching network.

Figure 6:
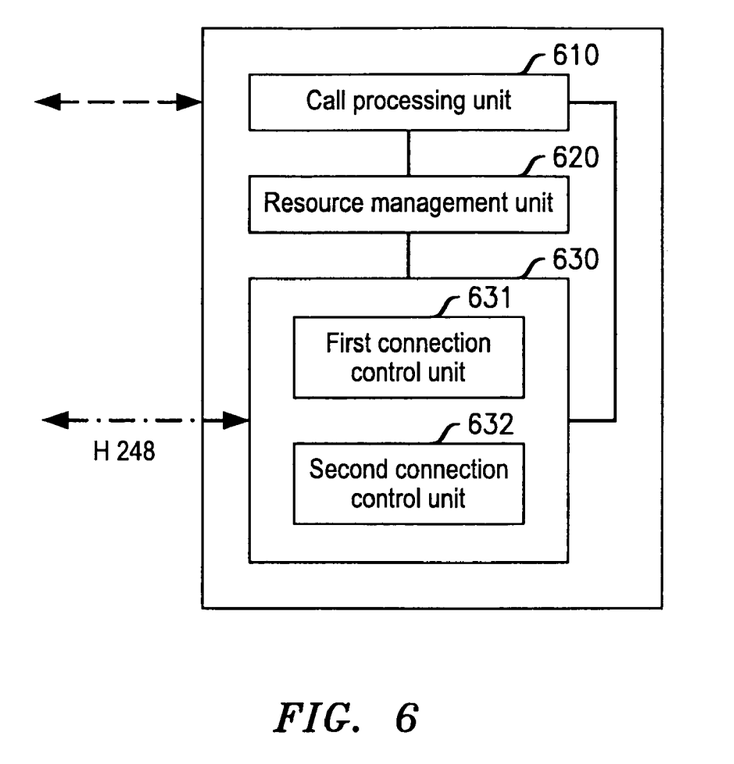
FIG. 6 is a schematic diagram illustrating portions of structure of the soft switch device of the present invention.

FIG. 6 is a schematic diagram illustrating structure of the soft switch device corresponding to the present invention. It can comprise call processing unit 610, resource management unit 620 and connection control unit 630, in which call processing unit 610 is usually used for providing control function for establishing, maintaining and releasing of basic call, relating call processing, connection control, resource control and etc. Corresponding to concept of the present invention, it receives a signaling message at the calling side from a signaling processing unit of the soft switch device, analyzes address information, state and service logic of the calling party and the called party and informs the connection control unit of connection control information, which is used for creating a context in the media gateway and adding semi-permanent physical terminations for the calling party and the called party into the context when the calling party and the called party are controlled by the same media gateway. Resource management unit 620 is used for managing resource state information of the calling party and the called party and providing state information associated with the calling party and the called party (such as information indicating that the called party is busy) to the call processing unit for processing of service logic determination. Connection control unit 630 controls connecting, establishing and releasing of media streams in the media gateway based on the connection control information from the call processing unit. Generally, it is based on interface protocol between the soft switch device and the media gateway (H.248/MEGACO). The media gateway creates a context therein and adds associated semi-permanent physical termination or ephemeral termination into the context, as shown in FIG. 5. When the calling party and the called party are controlled by the same media gateway, the media gateway ultimately creates context Cz containing the semi-permanent physical terminations of the calling party and the called party. Meanwhile, the connection control unit receives state information from the media gateway. Based on different object for control of the connection control unit, it can comprise a first connection control unit 631 and a second connection control unit 632 respectively for connection control on the gateways of the calling party and the called party.

It need to state that the above embodiments of the present invention have been presented by way of example only, and not limitation. While the detailed description is provided for the present invention referring to the above embodiments, those skilled in the art shall understand that modifications and equivalent replacements could be made herein without departing from the sprit and scope of the invention, which should be involved in the scope of the present invention limited by the attached claims.

We claim:

1. A method for soft switch call control, comprising the steps of:

acquiring, by a soft switch device, an initial address message (IAM) of a calling side originating from a calling party;

first analyzing, by the soft switch device, information of the calling party and a called party, creating a context at a media gateway and adding semi-permanent physical terminations for the calling party and the called party into the context when the calling party and the called party are controlled by a same media gateway, the first analyzing including, controlling, by the soft switch device, the media gateway to create the context and to add a semi-permanent physical termination and a ephemeral termination into the context, second analyzing, by the soft switch device, information of the calling party and the called party, to inform the media gateway to delete the ephemeral termination from the context created at the calling side when the calling party and the called party are controlled by the same media gateway, informing, by the soft switch device, the media gateway to add the semi-permanent physical termination at the called side into the context created at the calling side;

first transmitting, by the soft switch device, the initial address message (IAM) to a circuit switching network via a signaling gateway at the called side based on the context, the circuit switching network returning an acknowledge message (ACM) and the called party ringing; and second transmitting, by the soft switch device, the address complete message (ACM) to the signaling gateway at the calling side.

2. The method for soft switch call control according to claim 1, wherein said media gateway is a trunk gateway, an access gateway or an integrated access device.

3. The method for soft switch call control according to claim 1, wherein said semi-permanent physical termination is a time-division-multiplexing-based TDM termination.

4. The method for soft switch call control according to claim 1, wherein said ephemeral termination is a real-time-transmission-protocol-based RTP termination.

5. The method for soft switch call control according to claim 1, wherein said method further comprises the steps of:
  off-hooking, by the called party, and third transmitting, by the signaling gateway at the called side, an answer message (ANM) to the soft switch device;
  fourth transmitting, by the soft switch device, a Modify command to the media gateway and cutting off the ring back tone;
  fifth transmitting, by the soft switch device, an answer message (ANM) to the signaling gateway at the calling side.

6. A system comprising:
  a soft switch device connected to a plurality of media gateways via a packet switching network and configured to
    control the plurality of media gateways to establish service calls based on a received call signal, by analyzing information of a calling party and a called party based on an acquired initial address message (IAM) in the received call signal, and informing at least one of the plurality of media gateways to create a context at the at least one of the plurality of media gateways and to add semi-permanent physical terminations for the calling party and the called party into the context when the calling party and the called party are controlled by a same media gateway of the plurality of media gateways, and
    add an ephemeral termination into the context, delete the ephemeral termination from the context if the calling party and the called party are controlled by the same media gateway of the plurality of media gateways.

7. The soft switch device for soft switch call control according to claim 6, wherein said semi-permanent physical termination is a time-division-multiplexing-based TDM termination.

8. The system of claim 6, wherein the soft switch device further includes,
  a call processing unit for performing call control and processing, analyzing information and service logic of the calling party and the called party and informing a connection control unit of connection control information, which is used for creating a context in the at least one of the plurality of media gateways and adding semi-permanent physical terminations for the calling party and the called party into the context when the calling party and the called party are controlled by the same media gateway of the plurality of media gateways;
  a resource management unit for managing resource state information of the calling party and the called party;
  a connection control unit for controlling connecting, establishing and releasing of media streams in the at least one of the plurality of media gateways based on the connection control information from the call processing unit and receiving a response message from the at least one of the plurality of media gateways.

* * * * *